United States Patent [19]

Farr

[11] Patent Number: 5,066,077
[45] Date of Patent: Nov. 19, 1991

[54] HYDRAULIC SYSTEMS FOR VEHICLES

[75] Inventor: Glyn P. R. Farr, Warwickshire, England

[73] Assignee: Lucas Industries Public Limited Company, Birmingham, England

[21] Appl. No.: 335,839

[22] Filed: Apr. 10, 1989

[51] Int. Cl.⁵ ............................................. B60T 8/44
[52] U.S. Cl. ............................... 303/114 R; 303/110; 192/1.32
[58] Field of Search ............... 303/113, 114, 116, 117, 303/119, 91, 95, 100, 89, 93; 188/353; 192/1.32, 1.33, 134; 180/197

[56] References Cited

U.S. PATENT DOCUMENTS

| | | | |
|---|---|---|---|
| 3,448,822 | 6/1969 | Lone et al. | 303/91 |
| 4,073,359 | 2/1978 | Fujiki et al. | 303/110 X |
| 4,553,651 | 11/1985 | Gaiser et al. | 192/1.32 |
| 4,589,706 | 5/1986 | Leiber | 303/114 |
| 4,641,895 | 2/1987 | Belart et al. | 180/197 |
| 4,655,512 | 4/1987 | Leiber | 303/114 |
| 4,674,805 | 6/1987 | Leiber | 303/114 |
| 4,743,071 | 5/1988 | Iwamoto | 188/353 X |
| 4,832,417 | 5/1989 | Kehl et al. | 303/114 |

FOREIGN PATENT DOCUMENTS 2168120  6/1986  United Kingdom ............... 303/114

Primary Examiner—Matthew C. Graham
Attorney, Agent, or Firm—Renner, Kenner, Greive, Bobak, Taylor & Weber

[57] ABSTRACT

In a combined booster and hydraulic master cylinder assembly the reservoir connection is adapted to serve as an inlet for high pressure fluid and by way of which the assembly can be operated independently of the pedal. High pressure fluid is supplied to the connection under the control of auxiliary control valve responsive to signals for a sensor. The sensor may be arranged to enable the assembly to be used in a variety of modes, for example for traction control, as a 'hill holder', and for remote control of the speed of the vehicle.

17 Claims, 5 Drawing Sheets

HYDRAULIC SYSTEMS FOR VEHICLES

This invention relates to hydraulic systems for vehicles of the type having a front pair of wheels and a rear pair of wheels, of which first and second wheels of at least one pair are driven, and each wheel is provided with an hydraulically actuated brake, the system being of the kind comprising a combined booster, or servo, and hydraulic master cylinder assembly for applying all the brakes, a sensor for sensing the speed of rotation of each wheel, or of the vehicle itself and an electronic control module which receives signals from the sensor and is operative to actuate means in turn to control operation of a brake, whereby to control the behaviour of a respective wheel depending upon the nature and duration of the said signal.

In EP-A-87309754.7 we have disclosed an hydraulic system of the kind set forth in which a pedal is provided for actuating the combined assembly to apply the brakes normally for service vehicle retardation, and a servo-pressure control valve is operative to control the generation of servo assistance for the assembly in response to pressure generated by operation of the pedal, traction control valve means responsive to a spin signal from a driven wheel and recognised by the control module being adapted to control the generation of servo assistance for the assembly whereby to actuate the assembly independently of the pedal to apply the brake on the said driven wheel, the generation of the servo assistance by the traction control valve means being independent of and by-passing the servo-pressure control valve.

In one of the constructions disclosed in EP-A-87309754.7 the booster is of the hydraulic type and the servo-pressure control valve normally places a booster space in communication with a reservoir for fluid through a reservoir connection, and isolates the booster space from an hydraulic accumulator. When the control valve is operated in response to operation of the pedal the reservoir connection is closed, and pressure fluid from the accumulator is admitted to the booster space. When the traction control valve means is operated it closes the reservoir connection and admits fluid from the accumulator to the booster space independently of the control valve.

According to our invention, in an hydraulic system of the kind set forth a pedal is provided for actuating the combined assembly to apply the brakes normally for vehicle service retardation, a servo-pressure control valve is operative to control the generation of servo assistance for the assembly in response to pressure generated by operation of the pedal, the servo-pressure control valve being movable between a first position in which a pressure chamber is in communication with a reservoir connection leading to a reservoir for fluid, and a second position in which an hydraulic accumulator is in communication with the pressure chamber to energise the pressure chamber, an auxiliary control valve means is responsive to a signal from the control module to energise the pressure chamber independently of operation of the servo-pressure control valve, the auxiliary control valve means being movable between a first position in which the reservoir connection is in communication with the reservoir, and a second position in which the reservoir connection is in communication with the hydraulic accumulator.

Adapting the reservoir connection to feed the pressure chamber under the control of the auxiliary control valve means provides a simple construction since no modification of the combined assembly, which may be a commercially available item, will otherwise be required.

The pressure chamber may comprise the boost chamber of the booster, or a quick-fill chamber on its own or in combination with a boost chamber.

For traction control the assembly is adapted to operate in conjunction with an anti-lock braking system which has the ability to isolate the brakes of the non-driven wheels and connect those which have a tendency to spin.

When the vehicle is held by a foot-operated brake on an incline with the clutch depressed, the assembly is adapted automatically to apply the brakes to permit the driver to remove his foot from the brake pedal and place it on the accelerator pedal. When the driver wishes to move off, a release of the clutch pedal will automatically release the brake pressure. This system may also co-operate with an anti-lock system to isolate brake in part of the braking system.

For an automatic reduction in vehicle speed, should a driven vehicle become too close to a vehicle immediately in front, the brakes are adapted automatically to be applied by operation of the assembly by means of a remote signal. Such a system may also be used for traffic and speed limit control of futuristic vehicles.

When the vehicle is cornering any tendency for the driven wheels to spin will reduce the resistance to side forces and the vehicle ma slide out of control. This can be prevented by the automatic application of the brakes on the driven wheels which have a tendency to spin.

Some embodiments of our invention are illustrated in the accompanying drawings in which.

Figure 1:
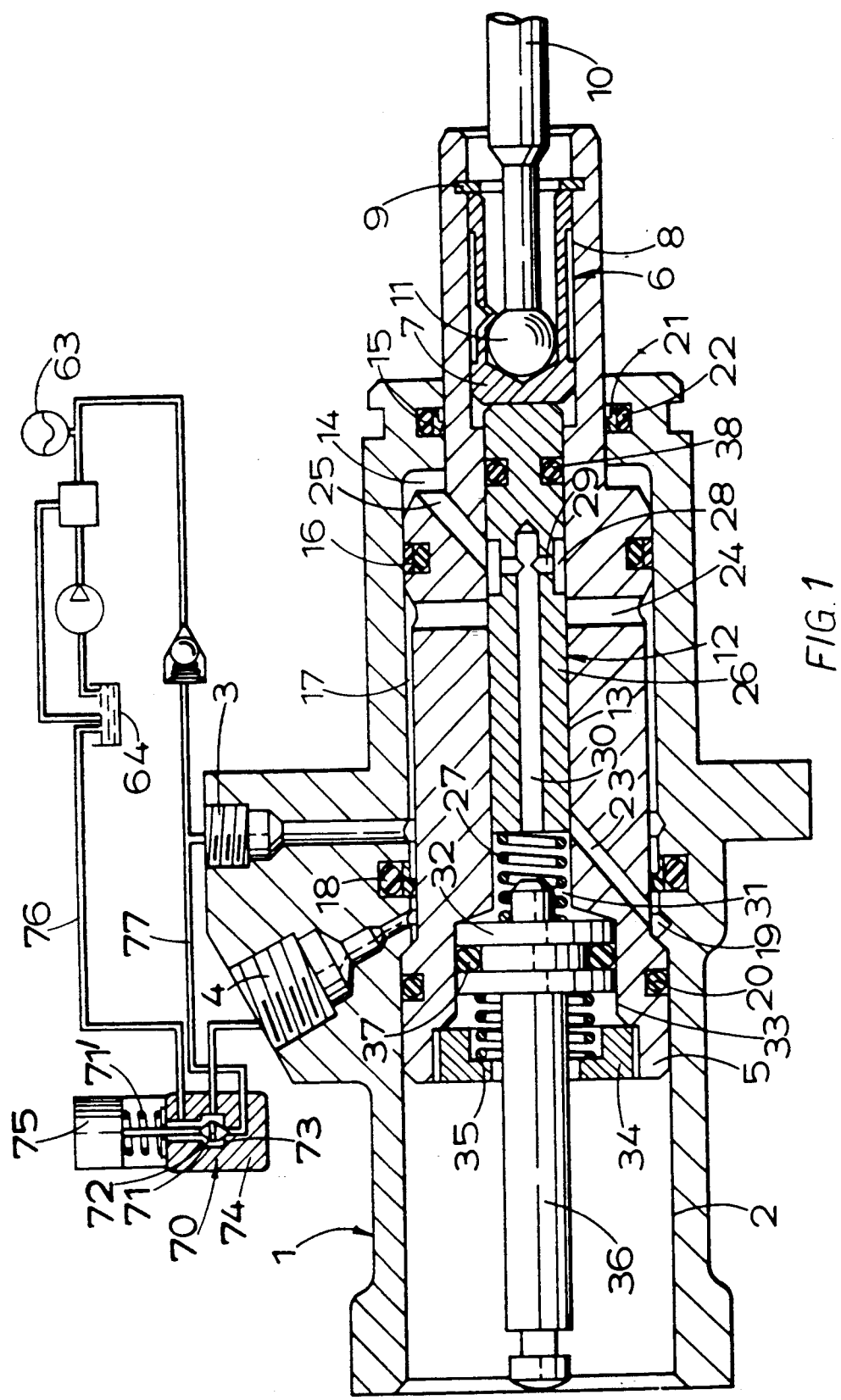
FIG. 1 is a longitudinal section through an hydraulic booster including auxiliary control valve assembly.

The booster of FIG. 1 has a housing 1 provided with a longitudinal stepped bore 2, an inlet 3 for connection to a source of high pressure hydraulic fluid, suitably an accumulator 63, and an outlet 4 for connection to a reservoir 64 for fluid through an auxiliary control valve assembly 70. A stepped boost piston 5 works in the bore 2, and the boost piston 5 is itself provided with a longitudinal stepped bore 6. An input member 7 works in the rearmost portion 8 of the bore 6, and is retained by a circlip 9. The input member 7 is actuated by an input rod 10 connected to a pedal (not shown), the rod 10 having a spherical head 11 which is retained in the input member 7. A valve means 12 also works in the boost piston bore 6, in a portion 13 of smaller diameter, and controls pressurisation of a boost chamber 14 defined in the bore 2 behind the boost piston 5 between a rearward seal 15 in the housing 1 and a rearward seal 16 on the boost piston 5.

The diameters of the boost piston 5 and the bore 2 are arranged so that an annular chamber 17 which is connected to the inlet 3 surrounds the boost piston 5. This high pressure chamber 17 is defined between the rearward seal 16 on the boost piston 5 and a forward seal 18 mounted in the wall of the bore 2 at a point where the boost piston 5 is spaced from the bore 2. A further annular chamber 19 surrounds the boost piston 5 forward of the high pressure chamber 17. The chamber 19 is connected to the outlet 4, and is defined between the forward seal 18 and a further forward seal 20 on the boost piston 5. The sealing diameter of the seal 16 is greater than that of the seal 18, so that the high pressure fluid in the annular chamber 17 acts to bias the boost piston 5 rearwardly.

An inclined passage 23 in the boost piston 5 leads from the annular reservoir chamber 19 to the bore portion 13. Similarly, radial passages 24 connect the annular chamber 19 to the bore portion 13, and an inclined passage 25 connects the boost chamber 14 to the bore portion 13. Communication between the passages is controlled by the valve means 12.

The valve means 12 comprises a cylindrical spool 26 working in the bore portion 13, and biassed rearwardly by a spring 27. The spool 26 has a port 28 for controlling communication between passages 24 and 25. The port 28 is connected by radial passages 29 to a blind bore 30 in the spool 26 which opens into a chamber 31 defined in the bore portion 13 forward of the spool 26. The passage 23 opens into the chamber 31 in the retracted position shown so that the boost chamber 14 is in communication with the reservoir chamber 19.

The chamber 31 forms an auxiliary pressure chamber, the pressure in which acts on an auxiliary piston 32 which works in a portion 33 of the bore 13 of larger diameter. The travel of the auxiliary piston 32 is limited by an end member 34 located in the bore 13. A spring 35 works between the end member 34 and the auxiliary piston 32 to bias the piston 32 rearwardly. The auxiliary piston 32 acts on an output rod 36 which is adapted to actuate a master cylinder with which the booster forms a combined assembly.

The auxiliary piston 32 and the spool 26 are sealed in the bore 6 by seals 37 and 38 respectively.

The auxiliary control valve 70 comprises a double-acting valve member 71 which is alternatively engageable with one of a pair of spaced seatings 72 and 73 in a housing 74 under the control of a solenoid 75. The seating 72 is disposed between the outlet 4 and a return line 76 to the reservoir 64, and the seating 73 between a supply line 77 from the accumulator 63 and the outlet 4.

The solenoid 75 is adapted to be energised by a current emitted by an electronic control module, (not shown) which, in turn, receives signals from wheel speed sensors associated with each of the front wheels of the vehicle, or from other sensing means.

The operation of the booster is as follows. The solenoid 75 is normally de-energised so that the valve member 71 is spring urged by spring 71' into engagement with the seating 73 and away from the seating 72. The outlet is therefore in open communication with the reservoir 64.

In the retracted position shown the auxiliary chamber 31 and the boost chamber 14 are in communication with the reservoir chamber 19. Pressure in the annular chamber 17 acts to bias the boost piston 5 rearwardly. When the pedal is operated, the load is applied to the input member 7 by the input rod 10. The input member 7 moves forward, and advances the spool 26 against the force in the spring 27. Movement of the spool 26 cuts off the passage 23 from the chamber 31, and hence from the boost chamber 14. Further movement of the spool 26 opens communication between passages 24 and 25 via the port 28 to allow high pressure hydraulic fluid into the boost chamber 14. Simultaneously the high pressure fluid is admitted into the auxiliary chamber 31, through passages 29 and blind bore 30, to act on the auxiliary piston 32. The areas of the boost piston 5 and auxiliary piston 32 are arranged so that at this stage of actuation the forces acting on the boost piston 5 in a forward direction are less than or equal to the forces acting of the boost piston 5 in a rearward direction. For this embodiment this means that (ignoring spring and friction forces) the area of the boost chamber 14 is less than or equal to the area of piston 32. Therefore the boost pressure in the auxiliary chamber 31 acts on the auxiliary piston 32 to advance it and the output rod 36 relative to the boost piston 5 to actuate the master cylinder and take up the clearances in the braking system. The auxiliary piston 32 engages with the end member 34, which prevents further movement of the auxiliary piston 32 relative to the boost piston 5.

When the auxiliary piston 32 engages with the end member 34 the force acting on the auxiliary piston 32 due to the boost pressure in the auxiliary chamber 31 is transmitted to the boost piston 5 to cancel out the rearwardly-acting force due to the boost pressure in the auxiliary chamber 31 acting directly on the boost piston 5. The rearwardly-acting force on the boost piston 5 is therefore reduced, and the boost piston 5 advances in the bore 2 to augment the output force.

The boost pressure also acts on the spool 26 in a rearward direction, and this reaction force is transmitted to the input member 7 to generate "feel" at the pedal. When the reaction force on the spool 26 equals the applied load from the pedal the boost piston 5 moves forward relative to the spool 26, cutting off communication between passage 24 and the port 28. The booster is then in its equilibrium or null position.

If the load on the pedal is reduced, but not wholly removed, the spool 26 will be able to move rearwardly relative to the boost piston 5 to open the passage 23, allowing the boost pressure to reduce and the boost piston to move rearwardly until the equilibrium position is reached again.

When the load on the pedal is removed, the spool 26 moves rearwardly to open the passage 23 to connect the auxiliary chamber 31 and the boost chamber 14 to the reservoir. The spool 26 and boost piston 5 move rearwardly, and when the boost pressure is reduced to a low level the spring 35 moves the auxiliary piston 32 back to its retracted position.

Should the solenoid 75 be energised by a current from the control module for automatic operation, the valve member 71 is urged against the spring loading away from the seating 73 and into engagement with the seating 72. This places the accumulator 63 in communication with the outlet 4, through which fluid under pressure is admitted into the chamber 31 through the inclined passage 23. The piston 32 is advanced in its bore 33 to actuate the master cylinder. If the piston 32 moves fully to its abutment defined by the end member 34, the boost piston 5 will move slightly to maintain the force on the master cylinder.

The booster is operated independently of the pedal and the valve means 12 to apply the brakes operated by the master cylinder.

No lost-motion device will be required between the brake pedal and the rod 10 since the travel of the piston 32 relative to the piston 5 should be sufficient to provide automatic application of the brakes applied by the master cylinder. In the unlikely event that the travel of the piston 32 will be insufficient, then the brake pedal will move a small distance away from the foot of the driver.

Figure 2:
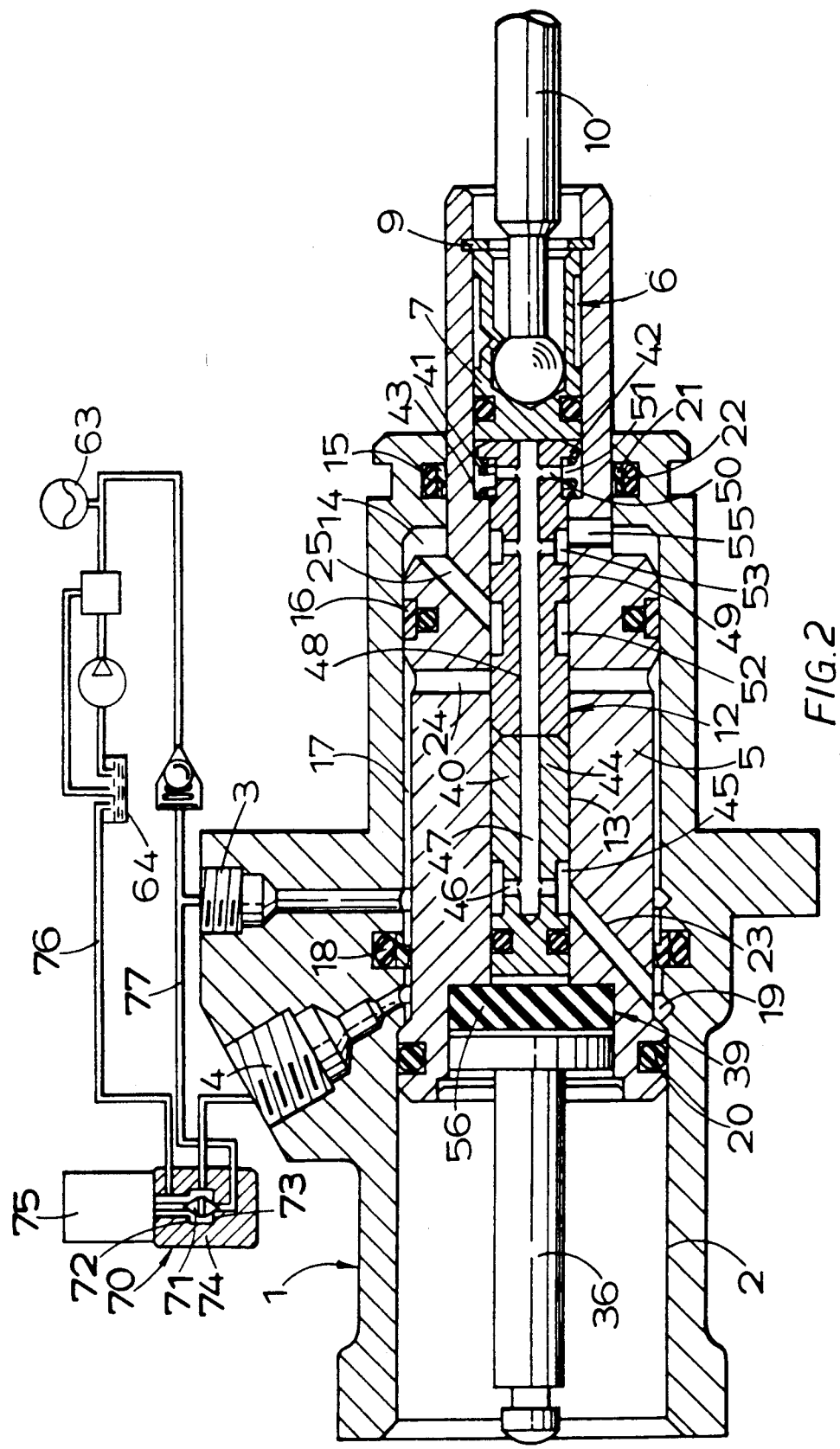
FIG. 2 is a longitudinal section through a further hydraulic booster.

The booster shown in FIG. 2 is basically similar in construction to that shown in FIG. 1, and corresponding reference numerals have been applied to corresponding parts. The differences lie in the arrangement of the valve means 12 and the use of a reducer mechanism 39, which replaces the auxiliary piston 32, to make the booster output reactive instead of input reactive.

Thus the general construction of the boost piston 5 is similar to that of FIG. 1, with the sealed annular chambers 17 and 19 surrounding the boost piston 5, and the input member 7 working in the bore 6 in the boost piston 5. The valve means 12, however, comprises two-piece spool 40, and a spring 41 acts between an enlarged shoulder 42 at the rear end of the spool 40 and a step 43 in the bore 6 to bias the spool rearwardly. A first spool piece 44 at the forward end has a port 45 which is permanently connected to the passage 23 leading to the reservoir chamber 19. The port 45 is connected by passages 46 to a blind bore 47 opening onto an axial bore 48 in a second spool piece 49. At its rearward end the spool piece 49 is provided with a diametral passage 50 connecting the bore 48 to a chamber 51 in the portion of the bore 6 in which the input member 7 works. Any pressure in chamber 51 acts rearwardly on the input member 7, but the chamber 51 is always connected to the reservoir chamber 17 by passage 50, bores 48 and 47, port 45 and passage 23 so that this pressure is constant.

The second spool piece 49 has an annular port 52 which controls communication between passages 24 and 25 to control communication between high pressure chamber 17 and the boost chamber 14. A port 53 on the second spool piece 49 is connected to the axial bore 48 by a diametral passage 54. The port 53 controls communication between the reservoir chamber 19 and a passage 55 in the boost piston 5 which leads to the boost chamber 14.

Instead of the auxiliary piston 32, a reducer mechanism 39, which comprises a rubber block 56, is located in the forward end of the bore 6 between the boost piston 5 and the output rod 36. The block 56 transmits a proportion of the load applied to the master cylinder through the valve means 12 back to the input member 7 to generate feel at the pedal. The booster is therefore output reactive rather than input reactive as in FIG. 1, in which action of the boost pressure provided the feel at the pedal.

The assembly of the booster of FIG. 2 is similar to that of FIG. 1, with the assembled boost piston 5 being inserted into the housing 1 through the forward end of the bore 2, so that the sealing diameter at the seal 16 passes through and resiliently deforms the seal 18 radially, the seal 18 then returning to seal on the boost piston 5.

In the inoperative position shown, all the parts are retracted, and the boost chamber 14 is connected to the reservoir chamber 19. When a load is applied to the pedal with the solenoid 75 de-energised, the input member 7 advances, moving the spring spool 40 against the force in the spring 41 and into contact with the block 56. Firstly the port 53 cuts off communication between the boost chamber 14 and the reservoir chamber 19, and then the port 52 opens communication between passages 24 and 25, to admit high pressure fluid to the boost chamber 14. The boost piston 5 advances in the bore 2, and applies a force to the master cylinder which is transmitted through the rubber block 56 and the output rod 36.

The reaction of the load applied to the master cylinder acts in a rearward direction and is transmitted through the output rod 36 to the block 56, deforming the block 56. The load applied to the master cylinder is reduced by the block 56 and this reduced load is fed back to the pedal through the spool 40 and the input member 7 to provide a reaction or feel at the pedal.

When the action applied to the spool 40 exceeds the load applied by the pedal the spool 40 moves relatively rearwardly until communication between the passages 24 and 25 is cut off. The booster is then in its equilibrium position.

If the input load is reduced, the block 56 urges the spool 40 rearwardly through a further distance to re-establish communication between the boost chamber 14 and the reservoir chamber 19, until the equilibrium position is reached again.

When the input load is removed altogether, the spool 40 moves rearwardly to connect the boost chamber 14 to the reservoir chamber 19, and the parts move back to their retracted positions shown.

When the auxiliary valve 70 is operated by the control module fluid under pressure from the accumulator 63 is admitted through the outlet 4 and through the passages 47,48 and 53 into the boost chamber 14. The boost piston 5 is advanced in the bore 5 and operates the master cylinder as described above.

A lost-motion device is provided between the rod 10 and the brake pedal to prevent the pedal from moving away from the foot during the automatic operation of the booster.

In the embodiments described above with reference to FIGS. 1 and 2, if the driver's foot is transferred to the brake pedal, or if the clutch pedal (referenced as pedal 150 in FIG. 5) is released in a hill hold mode in which the brakes have been applied by a signal from means responsive to the position of the clutch pedal to hold the vehicle on a hill, the solenoid 76 will be de-energised by suitable inhibit means, and the booster then reverts to normal operation.

The valve assembly 70 can also be operated by remote means, such as a radar signal, automatically to regulate the speed of the vehicle independently of the driver.

Figure 3:
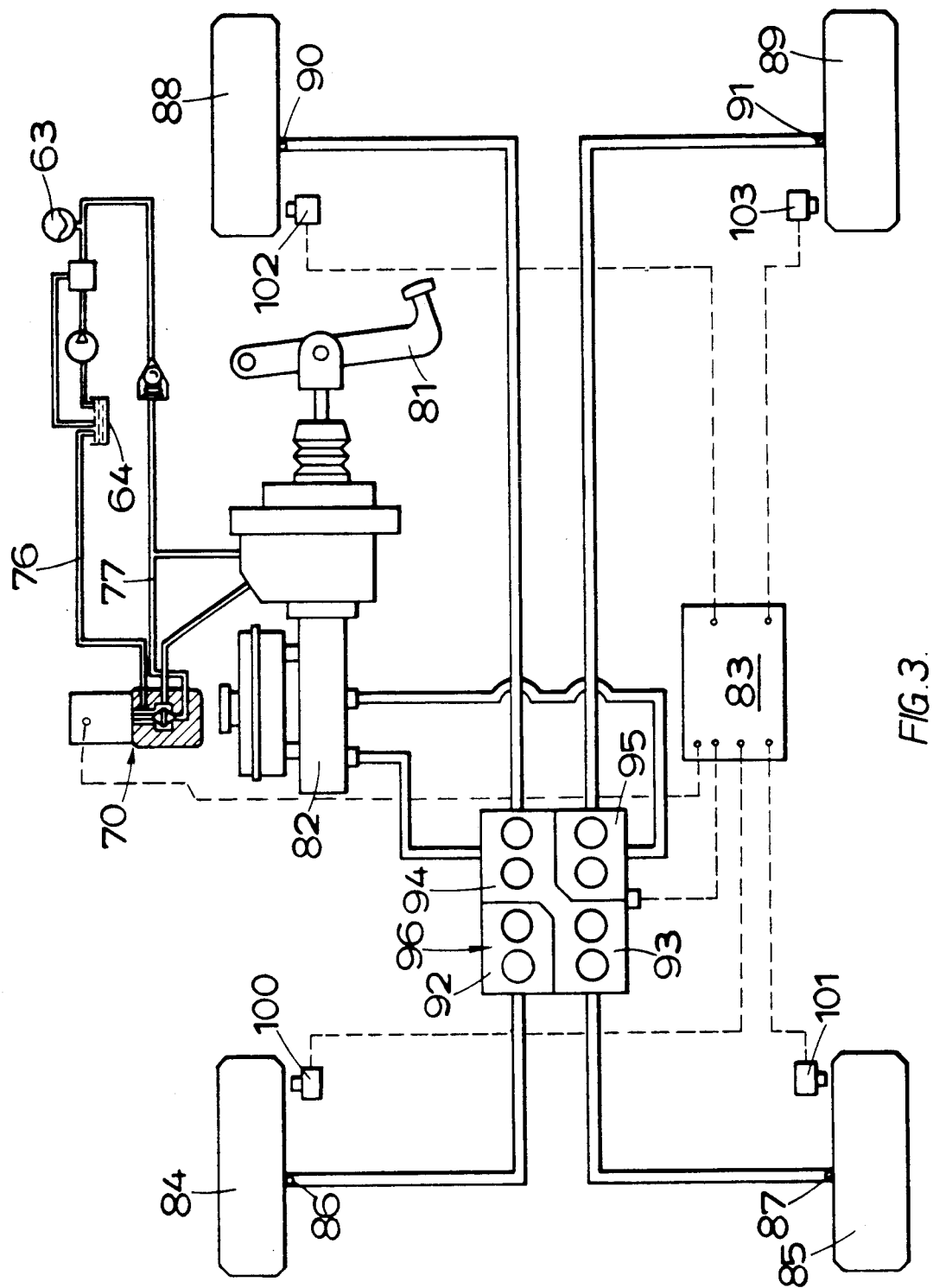
FIG. 3 is a layout of an hydraulic anti-lock braking system.

In the layout illustrated in FIG. 3 of the drawings, the booster of FIG. 1 or FIG. 2 is adapted to control operation of a tandem hydraulic master cylinder 82, either normally in response to operation of a pedal 81, or automatically in response to operation of the auxiliary valve 70 as dictated by energising current from an electronic control module 83.

The combined booster and master cylinder assembly is incorporated into an anti-lock hydraulic braking system of the four channel type. As illustrated each front wheel 84,85 is braked by a respective brake 86,87, and each rear wheel 88,89 is braked by a respective brake 90,91.

The supply of fluid to each brake from the master cylinder 82 is modulated by a respective modulator 92,93,94 and 95 of a combined assembly 96. Each wheel is provided with a respective speed sensor 100, 101, 102 and 103, with speed signals from each sensor being sent to the control module 83. This, in turn, operates the respective modulator or the solenoid 70 in accordance with the nature and duration of a particular signal.

The assembly is operable by the pedal 81 for normal service braking as described above, and the behaviour of each braked wheel is controlled in accordance with its behaviour by the respective modulator.

The auxiliary valve assembly 70 can be operated to achieve automatic operation of the booster independently of the pedal to achieve further modes, in addition to the hill hold or remote braking described above with reference to FIGS. 1 and 2.

As an improvement, during the 'hill-hold' mode, the control module 83 will receive a signal from the clutch pedal 150 together with an indication sensor for determining that the vehicle is facing uphill.

In an additional mode the valve assembly 70 can be operated for traction control to apply the brake on a spinning driven wheel. In such a case the signals from the respective speed sensor are recognised by the control module 83 which is operative to cause the modulators of the non-spinning wheels preventing the brakes on those wheels from being applied.

When cornering, any tendency for spinning of the driven wheels will reduce the resistance to side forces and the vehicle may slide out of control. This can be prevented by the automatic application, as determined by the control module 83, of the driven wheel or wheels which have a tendency to spin.

Figure 4:
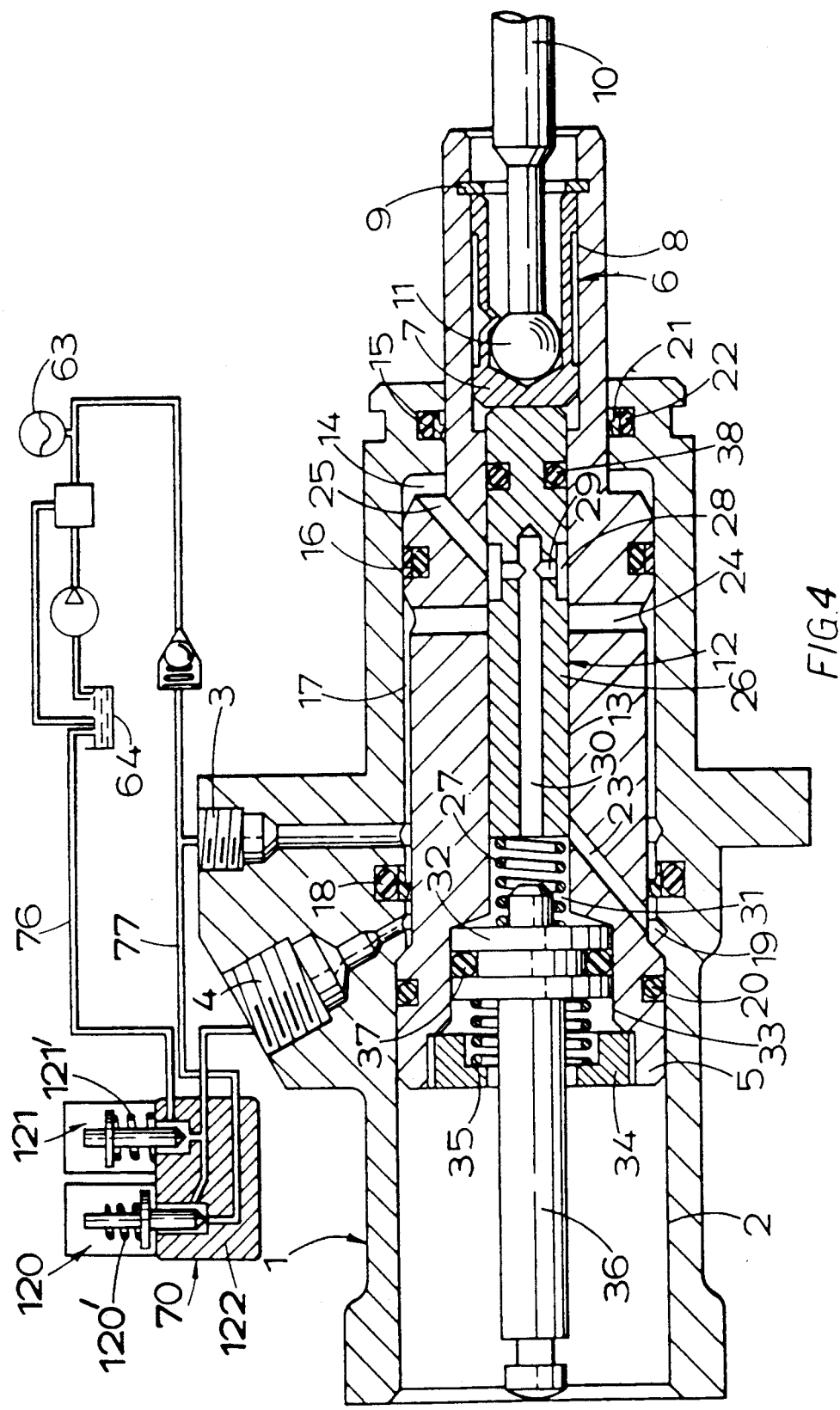
FIG. 4 is similar to FIG. 1 but including a modified control valve assembly.

The booster illustrated in FIG. 4 of the accompanying drawings is similar to that illustrated in FIG. 1 and corresponding reference numerals have been applied to corresponding parts.

In this embodiment, however, the auxiliary valve assembly 70 is modified in construction and comprises two single acting solenoid-operated valves 120 and 121 incorporated in a common body 122. The valve 120 is normally closed by means of a spring 120' to prevent fluid from the accumulator 63 entering outlet 4, and the valve 121 is normally held open by means of another spring 121' so that the chambers 31 and 14 can communicate with the reservoir 64 under the control of the valve means 12.

When the control module supplies energising current to the valve assembly 70, the valve 121 closes to isolate the reservoir 64 from the outlet 4 and the valve 120 opens so that pressure fluid from the accumulator can be supplied to the outlet 4 in order to operate the booster as described above.

After closure of the valve 121 the solenoid-operated valve 120 can be pulsed by the control module in order to increase incrementally the pressure applied to the brakes and, in consequence, gently to apply a retarding force on the vehicle.

This is particularly advantageous when the valve assembly 70 is operated in response to a signal from a remote sensor, suitably radar. Should another vehicle become too close, the level of retardation can conveniently be controlled as necessary from information from the wheel speed sensors or from a deceleration sensor. In this way the deceleration of the vehicle may be increased in proportion to the proximity of the vehicle immediately in front.

Figure 5:
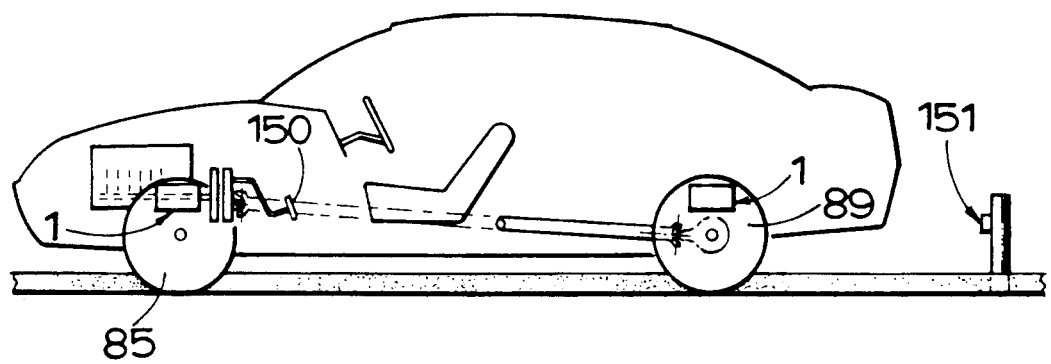
FIG. 5 schematically shows a vehicle incorporating an hydraulic anti-lock system in acordance with the invention.

FIG. 5 illustrates a remote radar sensor 151 by the side of a road.

The boosters of FIGS. 1 and 4 both have the advantage of taking up excess clearances with the auxiliary piston 32. This enables a relatively smaller master cylinder, or a higher pedal ratio, to be used so that, should the booster fail, a relatively smaller pedal effort to stop the vehicle will be required.

I claim:

1. An hydraulic system for a vehicle of the type having a front pair of wheels, and a rear pair of wheels, means for driving said wheels of a least one of said pairs, and an hydrualically actuated brake on each of said wheels, said system comprising a combined booster and hydraulic master cylinder assembly for applying all said brakes, said assembly having a pressure chamber, a reservoir for fluid, and a reservoir connection for connection to said reservoir, an hydraulic accumulator, a pedal for actuating said combined asdembly to apply said brakes normally for vehicle service retardation, a sensor for sensing the speed of rotation fo each said wheel, an electronic contorl module which receives signals from said sensor, means for controlling operation of at least one of said brakes, said means being actuated by sad control module whereby to control the behaviour of a respective wheel depending upon the nature and duration of the said signal, a servo-pressure control valve operative to control generation of servo assistance for said assembly in response to pressure generated by operation of said pedal, said servo-pressure control valve being movable between a first position in which said presure camber is in communication with said reservoir connection, and a second position in which said hydraulic accumulator is in communicatin with said pressure chamber to energise said pressure chamber, and an auxiliary control valve means responsive to a signal from said control module to energise said pressure chamber independently of operation of said servo-pressure control valve, said auxiliary control valve means being mvoable between a first position in which said reservoir connection is in communication with said reservoir, and a second position in which said reservoir connection is in communication with said hydraulic accumulator, and wherien a first hydraulic circuit is provided for said booster and comprises said pressure chamber, said reservoir, said reservoir connector, said accumulator, said servo pressure control valve, and said auxiliary valve control means; and a second independent hydraulic circuit is provided for said master cylinder and said means for controlling operation of at least one of said brakes, there being no mixing of the hydraulic fluid between the two circuits.

2. An hydraulic system for a vehicle of the type having a front pair of wheels, and a rear pair of wheel, means for driving said wheels of at least one of said pairs, and an hydraulically actuated brake on each of said wheels, said system comprising a combined booster and hydraulic master cylinder assembly for applying all said brakes, said assembly having a pressure chamber, a reservoir for fluid, and a reservoir connection for connection to said reservoir, an hydraulic accumulator, a pedal fr actuating said combined assembly to apply said brakes normally for vehicle service retardation, a sesnor for sensing the speed of said vehicle, an electronic control module which receives signals from said sensor, means for controlling operation of at least one of said brakes, said means being actuatd by said control module whereby to control the behaviour of a respective wheel depending upon the nature and duration of the said signal, a servo-pressure control valve operative to control generation of servo assistance for said assembly in response to presure generated by operation of said pedal, said servo-pressure control valve being movable between a first position in which said pressure chamber is in communication with said reservoir connection, and a second position in which said hydraulic accumulator is in communication with said pressure chamber to energise said pressure chabmer, and an auxiliary control valve means responsive to a signal from said control module to energise said pressure chamber independently of operation of said servo-pressure control valve, said auxiliary control valve means being mvoable between a first positin in which said reservoir connection is in communication with said reservoir, and a second position in which said reservoir connection is in communicatin with said hydraulic accumulator, and wherein a first hydraulic circuit is provided for sad booster and comprises said pressure chamber, said reservoir, said reservoir connector, said accumulator, said servo pressure control valve, and said auxiliary valve control emans; and a second independent hydraulic circuit is provided for said master cylinder and said means for contorlling operation of at leat one of said brakes, there being no mixing of the hydraulic fluid between the two circuits.

3. A system according to cliam 1 or claim 2, wherein said pressure chamber acts as a booster chamber.

4. A system according to claim 1 or claim 2, wherein said auxiliary control valve means comprises at least one solenoid-operated valve.

5. A system according to cliam 4, wherein the solenoid-operated valve comprises a housing, a solenoid responsive to signals from said control module, a pair of spaced seatings in said housing, a double-acting valve member which is alternatively engageable with one of said pair of spaced seatings under the control of sid solenoid, one of said seatings being disposed between said reservoir connection and said reservoir, and the other of said seatings being disposed between said accumulator and said reservoir connection.

6. A system according to claim 4, wherein said solenoid-operated valve comrpises first and second single acting solenoid-operated valves, of which the first valve controls communicatin between said reservoir connection and said reservoir, and said second valve controls communication between said accumulator and said reservoir connection.

7. A system according to claim 6, wherein said first valve comprises a first valve member, a first seating disposed between said reservoir connection and said reservoir and with which said first valve member is engageable, a first spring urging said first valve member away from said first seating, and a first solenoid responsive to signals from said control module for urging said first valve member towards said first seating against the force in said first spring, and wherein said second valve comprises a second member, a second seating disposed between said accumulator and said reservoir connection, a second spring for urging said second valve member towards said second seating, and a second solenoid responsive to signals from said control module for urging said second valve member away from said second seating against the force in said second spring.

8. A system according to claim 1, wherein said sensor comprises a wheel speed sensor.

9. A system according to claim 1 or claim 2, wherein said sensor comprises means responsive to the position of a clutch pedal to act as a 'hill holder' whereby to hold the vehicle on a hill.

10. A system according to claim 1, or cliam 2, wherein said sensor comprises means responsive to remote means.

11. A system according to claim 10, wherein said remote means comprises a radar signal.

12. A system according to claim 1 or claim 2, wherein said assembly is adapted to operate in conjunction with an anti-lock system having means adapted to isolate the brakes of the non-driven wheels from said assembly, and means for connecting to said assembly a brake on a driven wheel which has a tendency to spin, whereby to apply the said brake to prevent the said wheel from spinning.

13. A system according to claim 12, which is of the four-channel type.

14. An hydraulic system for a vehicle of the type having a front pair of wheels, and a rear pair of wheels, means for driving said wheels of a least one of said pairs, and an hydraulically actuated brake on each of said wheels, said system comprising a combined booster and hydraulic master cylinder assembly for applying all said brakes, said assembly having a pressure chamber, a reservoir for fluid, and a reservoir connection for connection to said reservoir, an hydraulic accumulator, a pedal for actuating said combined assembly to apply said brakes normally for vehicle service retardation, a sensxsor for sensing the speed of rotation of eahc said wheel, an electronic control module which receives signals from said sensor, means for controlling operation of at least one of said brakes, said means being actuated by said control module whereby to control the behaviour of a respective wheel depending upon the nature and duration of the said signal, a first, servo-pressure contorl, valve operative to control generation of servo assistance for said assembly in response to pressure generated by operation of said pedal, said servo-pressure control valve being movable between a first position in which said pressure cahmber is in communication with saied reservoir connection, and a second position in which said hydraulic accumulator is in communication with said pressure chamber to energise said pressure chamber, and a second valve comprising an auxiliary control valve means responsive to a signal from said control module to energise said pressure chamber independently of the position of said pedal and the operation of said first, servo-pressure control valve, said auxiliary control valve means being movable between a first position in which said reservoir connection is in communication with said reservoir, and a secon dposition in which said reservoir connection is in communication with said hydraulic accumulator, and wherein said assembly further comrpises an auxiliary piston working in an auxiliary chamber which is in fluid communication with said reservoir connection when said pedal is not depressed, and an output member connected to said auxiliary piston, said output member also comrpising a mechanical input to said master cylinder assembly, operation of said second auxiliary control valve allowing acucmulator pressure to act in said auxiliary chamber on said auxiliary piston and thereby move said output member independently of said pedal to actuaate said master cylinder.

15. An hydrualic system for a vehicle of the type having a front pair of wheels, and a rear pair of wheels, means for driving said wheels of a least one of said apirs, and an hydraulically actuated brake on each of said wheels, said sytem comprising a combined booster and hydraulic master cylinder assembly for applying all said brakes, said assembly having a pressure chamber, a resevoir for fluid, and a reservoir connection for connection to said reservoir, an hydrualic accumulator, a pedal for actuating said combined assembly to apply said brakes normally for vehicle service retardation, a sensor for sensing the speed of said vehicle, an electronic control module which receives signals from said sensor, means for controlling operation of at least one of said brakes, said means being actuated by said control module whereby to control the behaviour of a respective wheel depending upon the nature and duration of the said signal, a first, servo-pressure control, valve operative to control generation of servo assistance for said assembly in response to pressure generated by operation of said pedal, said servo-pressure control valve being movable between a first position in which said pressure chamber is in communication with said reservoir conection, and a second position in which said hydraulic accumulator is in communication with said pressure chamber to energise said pressure chamber, and a second valve comprising an auxiliary control valve means responsive to a signal from said control module to energise said pressue chamber independently of the position of said pedal and the operation of said first, servo-pressure control valve, said auxiliary control valve means being movable between a first position inwhich said reservoir connection is in communication with said reservoir, and a second position in which said reservoir connection is in communication with said hydraulic accumulator and wherein said assembly further coprises an auxiliary piston working in an auxiliary chamber which is in fluid communication with said reservoir connection when said pedal is not depressed, and an outuput member connected to said auxiliary piston, said output member also comprising a mechanical input to said master cylinder assembly, operation of said second auxiliary control valve allowing accumulator pressure to act in said auxiliary chamber on said auxiliary piston and thereby move said output member independently of said pedal to actuate said master cylinder..

16. A system according to claim 14 or claim 15, wherein a first hydraulic circuit is provided for said booster and comprises said pressure chamber, said reservoir, said reservoiir connector, said accumulator, said servo pressure control valve, and said auxiliary valve control means; and a secon dindependent hydraulic circuit is provided for sid master cylinder and asia means for controlling operation of at least one of said brakes, there being no mixing of the hydraulic fluid between the two circuits.

17. A system according to claim 14 or claim 15 wherein said second, auxiliary control, valve is connected to said reservoir connection by a connection fluid pathway and wherein in normal braking controlled by said pedal, when said second valve it in its first position, said hydrualic fluid flos in a first direction in said connection fluid pathway, from said reservoir connection to said second valve, and wherein when said second valve is in its second position braking is controlled by said control module and fluid-flows in a second direction in said connection fluid pathway opposite to said first direction, from said second valve to said reservoir connection.

* * * * *